US009515584B2

(12) United States Patent
Koller et al.

(10) Patent No.: US 9,515,584 B2
(45) Date of Patent: Dec. 6, 2016

(54) CONVERTER FOR AN ELECTRIC MOTOR

(71) Applicant: Robert Bosch GmbH, Stuttgart (DE)

(72) Inventors: Oliver Dieter Koller, Weinstadt (DE);
Martin Richter, Haldensleben (DE);
Harald Schueler, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/402,891

(22) PCT Filed: Apr. 3, 2013

(86) PCT No.: PCT/EP2013/056988
§ 371 (c)(1),
(2) Date: Nov. 21, 2014

(87) PCT Pub. No.: WO2013/174558
PCT Pub. Date: Nov. 28, 2013

(65) Prior Publication Data
US 2015/0108930 A1    Apr. 23, 2015

(30) Foreign Application Priority Data

May 21, 2012  (DE) .......................... 10 2012 208 460

(51) Int. Cl.
*H02H 7/09* (2006.01)
*H02P 6/12* (2006.01)
*H02M 7/219* (2006.01)

(52) U.S. Cl.
CPC ............... *H02P 6/12* (2013.01); *H02M 7/219* (2013.01); *H02P 6/28* (2016.02); *H02M 2007/2195* (2013.01); *Y02B 70/1408* (2013.01)

(58) Field of Classification Search
CPC ............... H02M 2001/0009; H02M 3/156; H02M 1/08; H02M 1/38; H02M 2001/0006; H02M 2001/0022; H02M 2001/0025; H02M 3/158; H02M 3/33553; H02M 3/33569; H02M 7/219; H02P 6/002; H02P 1/023; H02P 2201/03; H02P 27/06; H02P 6/085
USPC ............... 318/400.22, 400.26; 324/538, 415, 324/750.01, 750.03, 750.07, 754.03, 750.3, 522, 324/512, 429; 361/1, 5, 6, 18, 23, 30, 33
See application file for complete search history.

(56) References Cited

U.S. PATENT DOCUMENTS

| | | | | |
|---|---|---|---|---|
| 4,472,666 A | * | 9/1984 | Akeda | H02H 7/0833 318/400.08 |
| 5,363,333 A | * | 11/1994 | Tsujimoto | G11C 29/50 327/530 |
| 5,514,974 A | * | 5/1996 | Bouldin | H01L 22/34 324/750.3 |
| 5,723,974 A | * | 3/1998 | Gray | G01R 19/0092 323/282 |
| 5,959,464 A | * | 9/1999 | Qualich | G01R 19/0092 324/750.06 |

(Continued)

FOREIGN PATENT DOCUMENTS

EP    1 986 203    10/2008

*Primary Examiner* — Rita Leykin
(74) *Attorney, Agent, or Firm* — Norton Rose Fulbright US LLP; Gerard Messina

(57) ABSTRACT

A converter for an electric motor includes a semiconductor element connected at at least one contacting for converting a voltage, a voltage measuring device for measuring a voltage drop over the semiconductor component, and a control device for controlling the semiconductor component, the control device being configured to determine a state of the contacting based on the measured voltage drop.

19 Claims, 2 Drawing Sheets

(56) References Cited

U.S. PATENT DOCUMENTS

| | | | | |
|---|---|---|---|---|
| 6,097,203 A | * | 8/2000 | Parker | G01R 31/2884 |
| | | | | 324/538 |
| 6,377,109 B1 | * | 4/2002 | Yama | H02P 6/002 |
| | | | | 318/667 |
| 6,733,174 B2 | * | 5/2004 | Matsumoto | G01K 7/01 |
| | | | | 374/178 |
| 7,193,410 B2 | * | 3/2007 | Patel | H02M 3/1584 |
| | | | | 324/762.09 |
| 7,394,273 B2 | * | 7/2008 | Hsu | G01R 31/2858 |
| | | | | 324/750.3 |
| 7,606,099 B2 | * | 10/2009 | Chung | G11C 7/04 |
| | | | | 365/189.09 |
| 7,657,763 B2 | * | 2/2010 | Nelson | H02J 13/0013 |
| | | | | 323/234 |
| 7,719,302 B2 | * | 5/2010 | Hsu | G01R 31/2858 |
| | | | | 324/754.01 |
| 7,804,372 B2 | * | 9/2010 | Nakatani | G01K 7/01 |
| | | | | 327/142 |
| 8,271,117 B2 | * | 9/2012 | Ichinomiya | H01L 27/0203 |
| | | | | 365/211 |
| 8,497,694 B2 | * | 7/2013 | Chua-Eoan | G01R 29/26 |
| | | | | 324/750.15 |
| 2003/0076232 A1 | | 4/2003 | Sato et al. | |
| 2012/0049782 A1 | | 3/2012 | Suzuki | |

* cited by examiner

CONVERTER FOR AN ELECTRIC MOTOR

FIELD OF THE INVENTION

The present invention relates to a converter for an electric motor.

BACKGROUND INFORMATION

In electric motors, in generator operating mode it is possible to produce sinusoidal alternating voltages. In order to supply the vehicle electrical network with energy, these voltages are transformed into direct voltages by power-electronic bridge circuits. Diodes are standardly used for this purpose.

In order to additionally make it possible to provide motoric operating states and at the same time to improve the efficiency of generator operation through an active rectification, these diodes can be replaced by MOSFETs or IGBTs. A suitable controlling of the MOSFETs or IGBTs can realize both motoric and also generator-based operating states. The packaging of the transistors is degraded for example by increasing breakage of the solder, or cracks in a bonding connection over the operating life, and therefore presents a risk of failure for the system as a whole.

SUMMARY OF THE INVENTION

An object of the present invention is to indicate a converter that reduces the risk of failure.

This object may be achieved by the subject matter having the features as described herein. Advantageous specific embodiments of the present invention are the subject matter of the Figures, the description, and the further descriptions herein.

The present invention is based on the recognition that it is advantageous to acquire the state of a contacting of an electronic component in order to make it possible to introduce countermeasures if necessary.

According to an aspect of the present invention, the object of the present invention is achieved by a converter for an electric motor, having a semiconductor component connected at a contacting for converting a voltage, a voltage measuring device for measuring a voltage drop over the semiconductor component, and a control device for controlling the semiconductor component, the control device being configured to determine the state of the contacting of the semiconductor component on the basis of the measured voltage drop. In general, the converter can include one or more semiconductor components that are connected thermally and electrically at one or more contacting(s). Through this general form of the converter, the advantage is for example achieved that the degradation of a solder connection at at least one or more arbitrary semiconductor components can be acquired using a simple technical arrangement via a voltage drop, so that suitable measures can be taken to prevent failure of the converter.

In an advantageous specific embodiment, the semiconductor component is a semiconductor switch. In this way, for example the technical advantage is achieved that controllable semiconductor switches are used to convert the voltage. A semiconductor switch is a controllable electronic component for switching and amplifying electrical signals, such as a transistor.

In a further advantageous specific embodiment, the semiconductor component is a metal oxide semiconductor field effect transistor (MOSFET) or is a bipolar transistor having an insulated gate electrode (IGBT). In this way, for example the technical advantage is achieved that particularly suitable components can be used for the conversion of high currents.

In a further advantageous specific embodiment, the voltage measuring device is connected electrically to a drain terminal and to a source terminal of the MOSFET, or the voltage measuring device is connected electrically to a collector and to an emitter of the IGBT. In this way, the technical advantage is achieved that thermally stressed terminals and contactings of the converter can be monitored.

In a further advantageous specific embodiment, the converter includes a current measuring device for measuring a current through the semiconductor component. This achieves for example the technical advantage that, in addition to a voltage drop, as an additional parameter a current through the semiconductor component is determined, and the precision of the determination of the state of the contacting is improved.

In a further advantageous specific embodiment, the current measuring device includes a shunt resistor. This achieves for example the technical advantage that the current can be determined in a particularly simple manner using a simple technical arrangement.

In a further advantageous specific embodiment, the converter includes a temperature measuring device for measuring a temperature of the semiconductor component. In this way, for example the technical advantage is likewise achieved that as an additional parameter a temperature of the semiconductor component is determined, and the precision of the determination of the state of the contacting is improved. In addition, it can be ensured that the voltage drop is acquired at a particular temperature, so that comparability of the determined values is improved.

In a further advantageous specific embodiment, the converter includes a first semiconductor component connected at a first contacting, and a second semiconductor component connected at a second contacting, and the voltage measurement device is configured to measure a first voltage drop over the first semiconductor component and a second voltage drop over the second semiconductor component. In this way, for example the technical advantage is achieved that a plurality of contactings can be monitored simultaneously.

In a further advantageous specific embodiment, the converter is configured to compare the first voltage drop and the second voltage drop. In this way, for example the technical advantage is achieved that through the direct comparison of two contactings it can be determined which of the contactings is in a critical state.

In a further advantageous specific embodiment, the control device is configured to determine a voltage curve of the voltage drop over the semiconductor component as a function of an operating time of the semiconductor component. In this way, for example the technical advantage is likewise achieved that the precision of the determination of the state of the component is improved, and tendencies over the operating life of the component can be detected.

In a further advantageous specific embodiment, the control device is configured to determine a time derivative value of the voltage curve. In this way, for example the technical advantage is achieved that a thermal impedance can be determined that can be used as a further criterion for assessment.

In a further advantageous specific embodiment, the control device includes a storage device for storing voltage curves or voltage drop values at a particular time. In this way, for example the technical advantage is achieved that in the control device the values are acquired over a longer period of operation of the converter, and a database is increased.

In a further advantageous specific embodiment, the control device is configured to compare voltage curves or voltage drops stored in the storage device at different times. In this way, for example the technical advantage is achieved that a time curve and a creeping degradation of the solder can be recognized on the basis of the database, or outliers in the measurement can be recognized.

In a further advantageous specific embodiment, a reference voltage curve is pre-stored in the storage device. In this way, for example the technical advantage is achieved that, given deviations of a measured voltage drop curve from the reference curve, a degradation of the solder can be ascertained.

In a further advantageous specific embodiment, the converter has the possibility of communicating the current state to a higher-order regulating unit that reacts correspondingly thereto and introduces countermeasures. In this way, for example the technical advantage is achieved that when there is incipient degradation of a solder connection a loading of the semiconductor element can be reduced.

According to a further aspect of the present invention, the object according to the present invention can be achieved by a method for converting a voltage using a converter for an electric motor having at least one semiconductor element connected at at least one contacting, having the steps of a measurement of a voltage drop over the semiconductor element, a determination of the state of the contacting on the basis of the measured voltage drop, and a controlling of the semiconductor component as a function of the determined state of the contacting. In this way, the same technical advantages are achieved as are achieved by the corresponding device.

Exemplary embodiments of the present invention are shown in the drawings and are described in more detail below.

DETAILED DESCRIPTION

Figure 1:
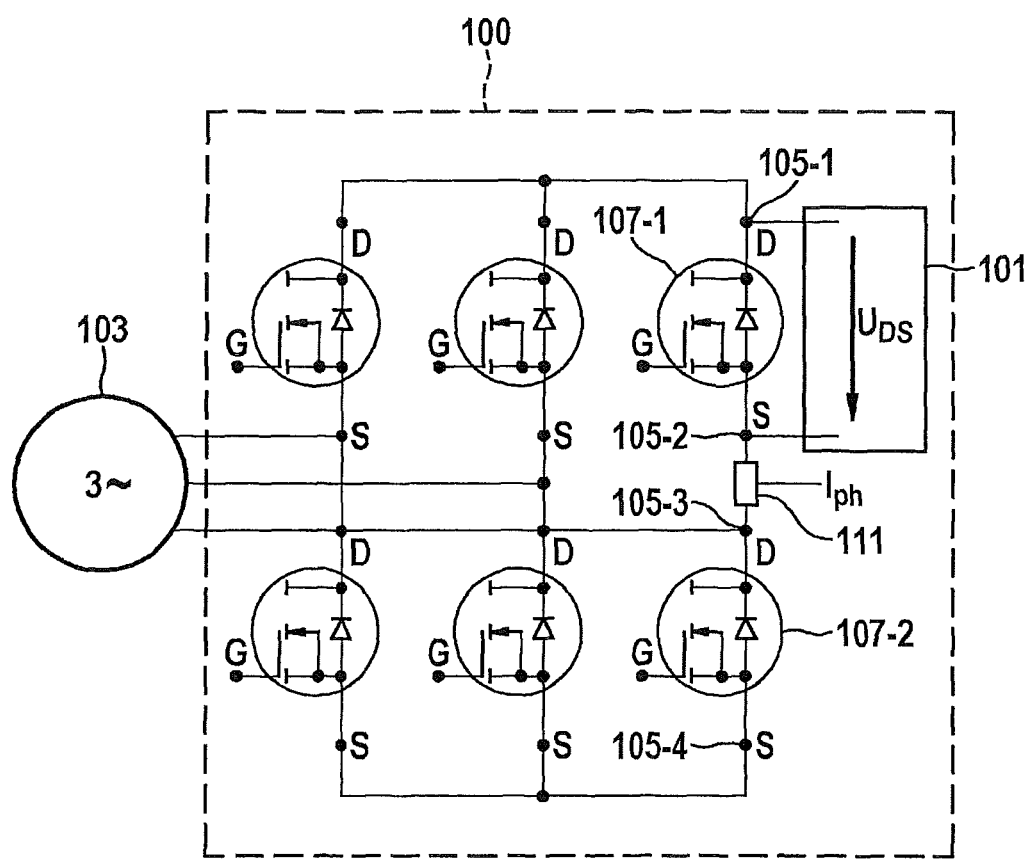
FIG. 1 shows a schematic view of a converter according to the present invention.

FIG. 1 shows a schematic view of a converter 100 for a three-phase electric motor 103 having a voltage measurement device 101 for measuring a voltage drop $U_{DS}$ over a semiconductor element 107-1.

Converter 100 converts for example an input voltage supplied by a vehicle battery into a three-phase alternating voltage for electric motor 103. For this purpose, converter 100 has six semiconductor components 107-1, 107-2. These components 107-1, 107-2 are formed for example by MOSFETs or by IGBTs, switched by a control unit (not shown) in such a way that there results a three-phase alternating current. The present invention is not limited to the depicted converter, but rather can be used in general for any converter.

Semiconductor components 107-1, 107-2 are electrically, mechanically, and thermally connected to the rest of the circuit at contacting points or bonding points 105-1, 105-2, 105-3, 105-4. The electrical or mechanical bonding to contacting points 105-1, 105-2, 105-3, 105-4 is realized by a suitable packaging.

Semiconductor components 107-1, 107-2 are for example soldered, together with other components, on a circuit board, at contacting points 105-1, 105-2, 105-3, 105-4, so that an electrical contacting of the corresponding component takes place. For the soldering of the components, solders having various properties can be used. Solder is a metal alloy that, depending on its intended use, is made up of particular mixing ratios of metals such as lead, tin, zinc, silver, and copper.

However, the packaging of the semiconductor components can for example be degraded through increasing breakage of the solder or cracks in a bonding connection over the operating life, due to thermal fluctuations or other environmental influences. This fact creates a risk of failure for the overall system.

The degradation of the packaging over the operating life of converter 100 results in a reduction in the mechanical contacting, and thus to a detectable increase in the thermal impedance. Because as a result the heat of semiconductor component 107-1, 107-2 is inadequately carried off, there results additional thermal loading of semiconductor component 107-1, 107-2.

In semiconductor components 107-1, 107-2 having a positive temperature coefficient, this thermal loading results in additional heating, because as the temperature increases these components have a greater electrical forward resistance. As a result, power loss in turn increases, and the heat that is to be carried off from semiconductor element 107-1, 107-2 also increases. If the heat is not carried away, a feedback loop results, which causes progressively greater heating of semiconductor component 107-1, 107-2.

The described feedback effect causes rapid aging with premature failure or destruction of the semiconductor component, because its permissible boundary temperature is exceeded. Such failure often takes place suddenly and unexpectedly.

For this reason, it is advantageous to timely recognize a critical state of the packaging, and to slow the process of degradation through suitable measures. For this purpose, the state of the packaging is monitored during operation of converter 100. Worsening of the state of the bonding or contacting of the transistor is detected. In general, this is a deterioration of the solder layer. The change in the bonding can be recognized in that heat is more poorly able to be carried off from inside the semiconductor, resulting in higher electrical voltages.

The state of the bonding or contacting is given by the capacity of the bonding or contacting to carry off heat. A worsening of the state can for example be caused by cracks in the solder or by oxidation. If increasing degradation is recognized by the diagnostic system, this diagnosis can be reacted to through limiting regulation. This can be classical limiting regulation measures, such as a reduction of the maximum power levels, or reduction of the maximum duration of motoric and generator operating states (recuperation/boost), or an adaptation of the operating strategy that reduces the rises in temperature and thus reduces the loading of the semiconductor elements. In this way, the time of failure can be delayed.

An adaptation in a hybrid system can mean the use of classical generator operation already at a higher state of charge (SOC), and thus on the one hand increasing the voltage level of the vehicle electrical network, and on the other hand limiting the maximum energy throughput during an event such as a recuperation. The increase of the voltage level results in lower currents at the same power level, and thus to a lower power loss input in the chip, which, like the limitation of the maximum energy throughput, results in a reduction of the temperature rises and in general reduces the $CO_2$ potential less strongly than classical limiting regulation strategies. In another specific embodiment of the operating strategy adaptation, the use of motoric operating states can be limited. In the same manner as a reduction of a maximum permissible generator current, these adaptations have the effect that the imposed energy loss and the resulting temperature peaks are reduced.

In this way, a reaction is made, using suitable measures, to the increasing deterioration of the packaging, and for example the process of solder breakage is slowed.

In addition, in a vehicle a signal can be made indicating a repair measure to be taken, a service interval can be shortened, and/or an emergency operating mode (limp-home strategy) can be introduced.

In order to determine the state of the packaging, a sensor system is used to determine the voltage drop over a drain-source terminal of a MOSFET or of a collector-emitter terminal. In an advantageous specific embodiment, in addition a current flowing through semiconductor component 107-1 is determined, for example through the use of a shunt resistor. In a further specific embodiment, a temperature sensor is present in the vicinity of the semiconductor component. The measure can be a function of how strongly the determined measurement values deviate from reference values.

If an increased voltage drop is measured at one or more semiconductor components 107-1, 107-2 for the same measurement current, a higher power loss is noted there. Because for example the electrical transition resistance at the semiconductor component increases with increasing breakage of the solder or increasing degradation of the bonding connection, this permits inferences to be made concerning the degradation of the packaging.

For the determination of the degree of degradation of the packaging of the semiconductor components, such as MOSFETs or IGBTs, inactive phases of the electric motor during a driving cycle are used. The electric motor is in an inactive phase when the high-voltage battery is sufficiently charged. For reasons of energy efficiency, in this situation a waiting period takes place for a possibility for recuperation of braking energy in order to supply the vehicle electrical network with energy. During the inactive phases, defined currents are conducted through the respective MOSFET or IGBT transistors, and the resulting voltages over the drain and source, or collector and emitter, are measured and compared to one another. When there is a uniform degradation of all transistors, an equal voltage drop occurs over all components.

Figure 2:
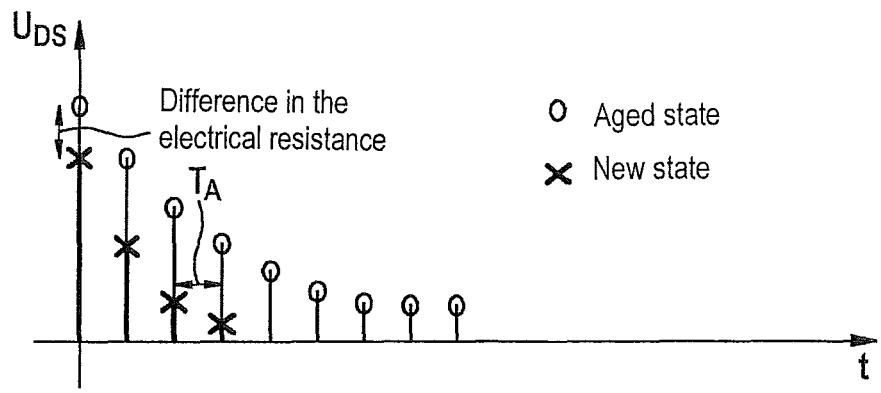
FIG. 2 shows a curve of a voltage drop during operation of a semiconductor component.

FIG. 2 shows a curve of a voltage drop $U_{DS}$ during operation of a semiconductor component in an aged state (circles) and in an unused, new state (crosses), as a function of operating time t. In each case, the curve is made up of a multiplicity of discrete measurement points for a voltage drop $U_{DS}$ over the semiconductor component in a temporal interval $T_A$.

In a simplified manner, physical quantity $U_{DS}$ is shown for only one transistor as semiconductor component 107-1. In general, however, the relation holds for all semiconductor components 107-1 and 107-2 used in converter 100.

Aging of the packaging results in a higher thermal impedance due to a reduction of the contacting surface. This results in a slower dissipation of heat, and thus also in a slower-falling voltage curve $U_{DS}$ over semiconductor component 107-1. The fall-off over time of the voltage curve is therefore a measure of the thermal impedance of the semiconductor component.

A semiconductor element 107-1 having an unaged packaging therefore has a rapid fall-off of the voltage curve $U_{DS}$ (crosses), while a semiconductor component 107-1 having an aged packaging has a slow fall-off of voltage curve $U_{DS}$ (circles).

Figure 3:
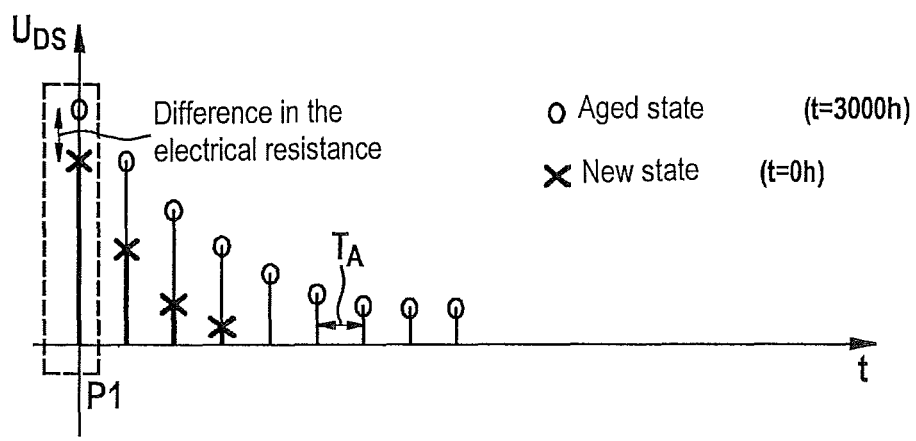
FIG. 3 shows a curve of a voltage drop during operation of a semiconductor component and the curve of an initial voltage as a function of an overall operating time.
Figure 3:
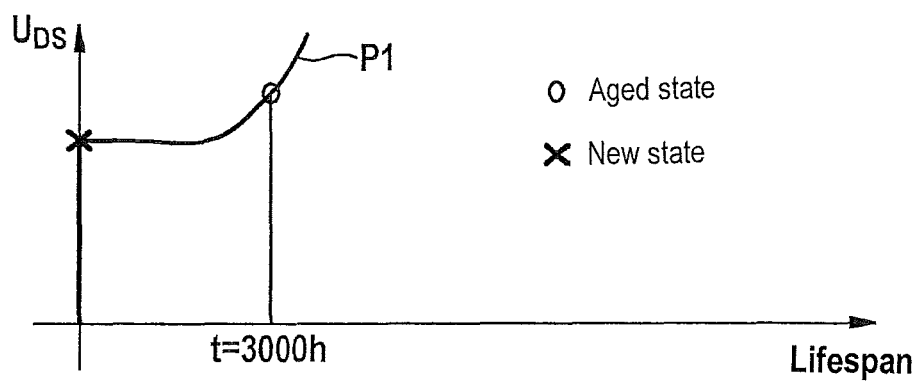

FIG. 3 shows the curve shown in FIG. 2 of a voltage drop $U_{DS}$ during operation of a semiconductor component 107-1, and the curve of an initial voltage P1, as a function of an overall operating time.

In order to determine the general aging or the state of the packaging, voltage values are used that for example are determined in each case at the beginning of the operating time, such as during a tape end measurement of the bridge circuit, or a first operation of the engine/generator in the target system. In the determination of these voltage values, the ambient temperature, determined using a temperature sensor, should be in a range similar to that in a comparison or reference measurement.

Under the assumption that all semiconductor elements are subject to similar ambient conditions, differences in the ambient conditions compared to the reference measurements can be compensated by comparing the change in the voltage drop between the semiconductor components, for example through a formation of the median value of the change of the voltage drop after current entry. A shift in the overall level can be recognized and correspondingly evaluated in this way.

Here, the initial voltage is first measurement point P1 of the voltage curve shown in FIG. 3. In the lower part, this value is plotted over an overall operating duration of the semiconductor component. If the overall operating duration exceeds a critical value, initial voltage drop $U_{DS}$ increases. Beginning from an exceeding of a voltage reference value, one of the above-described countermeasures can be introduced.

With regard to the heating of the thermal masses of semiconductor components 107-1 and 107-2, it should be ensured that to the greatest possible extent, identical measurement conditions obtain. These conditions are a function of the packaging, and can be determined by computer ahead of time. A plurality of reference curves, pre-stored in a storage unit, under respectively different operating conditions result in expanded comparison possibilities during operation. The storage device can for example be a computer storage device such as an electronic RAM memory, a ROM memory, a flash memory, or a magnetic storage device. The storage device can be provided in a control device for controlling semiconductor component 107-1.

In addition, via the temperature sensor a temperature can be determined at which the measurement of the voltage drop takes place.

The fall-off over time of the voltage curve directly reflects the thermal impedance and the state of the packaging. In order to leave outliers out of consideration during the measurements, through storage of the voltage curve a tendency for the state of the packaging can be stored. In this way, the precision of a determination of the state of the packaging can be further improved.

The predictive force concerning a state of the packaging can be increased by determining a plurality of voltage values one after the other immediately after the current entry and producing a measurement curve, or tracking the tendency over the lifespan of the component.

In this way, the degradation curve can be monitored both through the comparison of voltage drops $U_{DS}$ between the various semiconductors 107-1 and 107-2 and also in relation to the previous history of semiconductor 107-1. In this way, it can be taken into account that the original state of the transistors differs due to manufacturing tolerances.

In general, for the measurement methodology used it should be the case that no further stimulation of a type of error takes place, no formation of torque takes place in the electric motor, and there takes place no significant loading of the voltage supply. These preconditions can for example be met through the inputting of short, defined current ramps. A plausibilization of the impressed current can take place via a provided current sensor.

The present invention can be used in a boost-recuperation system (BRS) in motor vehicles. It is also conceivable to use it in starter motors and in generators (SG). However, in principle the present invention can be used in any vehicle hybrid systems and generator and engine control units, using bridge circuits.

All individual features of the present invention explained in the description and shown in the Figures can be combined with one another in any rational manner in order to simultaneously realize the advantageous effects thereof.

What is claimed is:

1. A converter for an electric motor, comprising:
   a semiconductor component connected at at least one contact for converting a voltage, the semiconductor element including a first semiconductor element connected at a first contact, and a second semiconductor element connected at a second contact;
   a voltage measuring device for measuring a voltage drop over the semiconductor component, the voltage measuring device measuring a first voltage drop over the first semiconductor component, and a second voltage drop over the second semiconductor component; and
   a control device to control the semiconductor component, the control device configured to compare the first voltage drop and the second voltage drop, and wherein the control device is configured to determine a state of the first and second contacts based on the comparison, and wherein the control device controls a load applied to the semiconductor component based on the determined state.

2. The converter of claim 1, wherein each of the first and second semiconductor elements is a semiconductor switch.

3. The converter of claim 1, wherein each of the first and second semiconductor elements is a metal oxide semiconductor field effect transistor (MOSFET) or a bipolar transistor having insulated gate electrode (IGBT).

4. The converter of claim 3, wherein the voltage measuring device is connected electrically to a drain terminal and to a source terminal of the semiconductor field effect transistor (MOSFET), or the voltage measuring device is connected electrically to a collector and to an emitter of the bipolar transistor with insulated gate electrode (IGBT).

5. The converter of claim 1, wherein the converter has a current measuring device to measure a current through the semiconductor component.

6. The converter of claim 5, wherein the current measuring device has a shunt resistor.

7. The converter of claim 1, wherein the converter has a temperature measuring device to measure a temperature of the semiconductor component.

8. The converter of claim 1, wherein the control device is configured to determine a voltage curve of the voltage drop over the semiconductor component as a function of an operating time of the semiconductor component.

9. The converter of claim 8, wherein the control device is configured to determine a time derivative value of the voltage curve.

10. The converter of claim 8, wherein the control device has a storage device to store voltage curves or voltage drop values at a particular time.

11. The converter of claim 10, wherein the control device is configured to compare voltage curves or voltage drop values stored in the storage device at different times.

12. A method for converting a voltage for an electric motor, the method comprising:
    measuring a first voltage drop over a first semiconductor component, wherein the electric motor has a converter having the first semiconductor component, which is connected at at least one first contact, and having a second semiconductor component connected at a second contact;
    measuring a second voltage drop over the second semiconductor component;
    comparing the measured voltage drops to provide a comparison;
    determining a state of the contacts as a function of the comparison; and
    controlling a load applied to the first and second semiconductor components based on the determined state.

13. The converter of claim 10, wherein the control device is configured to predict a future voltage curve corresponding to the measured voltage drop over the semiconductor component based on at least one of: the stored voltage curves, the voltage drop values, and a history of measurements of the semiconductor component.

14. The converter of claim 1, wherein the control device is configured to control the load applied to the semiconductor component based on a previous history of the semiconductor component.

15. The converter of claim 14, wherein the previous history relates to one of an original state of the semiconductor component and at least one manufacturing tolerance of the semiconductor component.

16. The converter of claim 1, wherein the converter and the electric motor are disposed in one of: a boost-recuperation system of a motor vehicle, a starter motor, a generator, a vehicle hybrid system, and a bridge circuit.

17. The converter of claim 9, wherein the time derivative value of the voltage curve is used by the control device to determine a thermal impedance of the converter.

18. The converter of claim 9, wherein the state is one of: a critical state, a non-critical state, and a transitioning state, wherein the transitioning state exhibits, over time, at least one of: (i) an increase in electrical resistance as compared to an expected electrical resistance and (ii) a slow fall-off in the measured voltage drop as compared to an expected voltage drop.

19. A converter for an electric motor, the converter comprising:
    a semiconductor component connected at at least one contact for converting a voltage;
    a voltage measuring device configured to measure a voltage drop over the semiconductor component;
    a storage device that stores reference curves, each of the reference curves indicating an expected voltage drop corresponding to a set of reference environmental conditions; and a control device configured to:
compare the measured voltage drop and the expected voltage drop, wherein the expected voltage drop corresponds to the set of reference environmental conditions representative of a set of environmental conditions of the semiconductor component, and
communicate a modification suggestion based on the comparison to a regulating unit connected to the converter that introduces countermeasures according to the modification suggestion.

* * * * *